US007715697B2

(12) United States Patent
Ono et al.

(10) Patent No.: US 7,715,697 B2
(45) Date of Patent: May 11, 2010

(54) BROADCAST PROGRAM RECORDING METHOD AND BROADCAST RECEIVER, AND INFORMATION RECORDER FOR THE SAME

(75) Inventors: Atsuhiro Ono, Kitaura (JP); Kazuto Shimagami, Mito (JP)

(73) Assignee: Hitachi, Ltd., Tokyo (JP)

( * ) Notice: Subject to any disclaimer, the term of this patent is extended or adjusted under 35 U.S.C. 154(b) by 960 days.

(21) Appl. No.: 11/180,539

(22) Filed: Jul. 14, 2005

(65) Prior Publication Data

US 2006/0045465 A1 Mar. 2, 2006

(30) Foreign Application Priority Data

Aug. 25, 2004 (JP) ............................. 2004-244719

(51) Int. Cl.
*H04N 5/00* (2006.01)
(52) U.S. Cl. ..................... 386/126; 386/124; 386/125; 386/98; 707/205
(58) Field of Classification Search ......... 386/111–112, 386/124–126, 98; 707/205
See application file for complete search history.

(56) References Cited

U.S. PATENT DOCUMENTS

| 6,442,115 | B1* | 8/2002 | Shimoda et al. | 369/47.28 |
| 7,076,662 | B2* | 7/2006 | Ishizaka | 713/181 |
| 2002/0021647 | A1* | 2/2002 | Aoki | 369/59.25 |
| 2002/0191512 | A1* | 12/2002 | Arioka et al. | 369/47.53 |
| 2004/0246878 | A1* | 12/2004 | Park | 369/124.03 |
| 2006/0133223 | A1* | 6/2006 | Nakamura et al. | 369/30.3 |
| 2006/0288263 | A1* | 12/2006 | Nakamura | 714/710 |
| 2007/0133948 | A1* | 6/2007 | Kikuchi et al. | 386/95 |
| 2008/0222173 | A1* | 9/2008 | Aridome et al. | 707/100 |

FOREIGN PATENT DOCUMENTS

| CN | 1262506 A | 8/2000 |
| EP | 1 024 492 | 6/2007 |
| JP | 2000-013743 | 1/2000 |
| JP | 2002-32975 | 1/2002 |
| JP | 2002-109833 | 4/2002 |
| JP | 2002-170361 | 6/2002 |

\* cited by examiner

*Primary Examiner*—Thai Tran
*Assistant Examiner*—Helen Shibru
(74) *Attorney, Agent, or Firm*—Antonelli, Terry, Stout & Kraus, LLP.

(57) ABSTRACT

A broadcast receiver includes a tuner section for receiving a broadcast program, an MPEG decoder 126 for converting a signal coming from the tuner section into a given format, and a hard disk drive (HDD) for recording the converted digital signal. In the broadcast receiver, a HDD medium of the HDD for recording the received broadcast program has, separately, a stream area for storing stream data as a video/audio signal, and a management data area for storing management data other than the stream data, and these areas are formatted by each different given unit. With such a structure, the broadcast receiver becomes highly-usable, requiring less time for the search operation on an HDD at the time of system startup. There is also a method for recording broadcast programs received by the broadcast receiver, and an information recorder for such use.

5 Claims, 3 Drawing Sheets

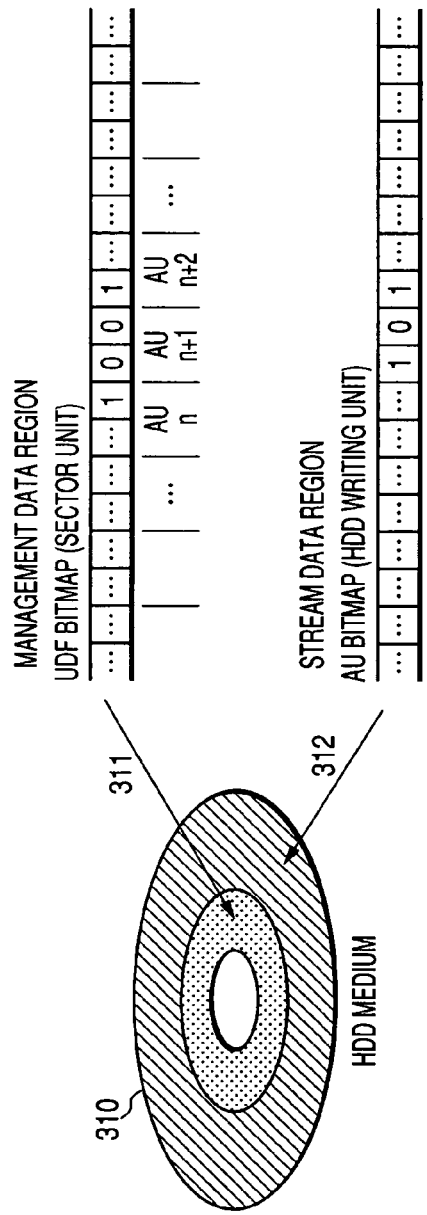
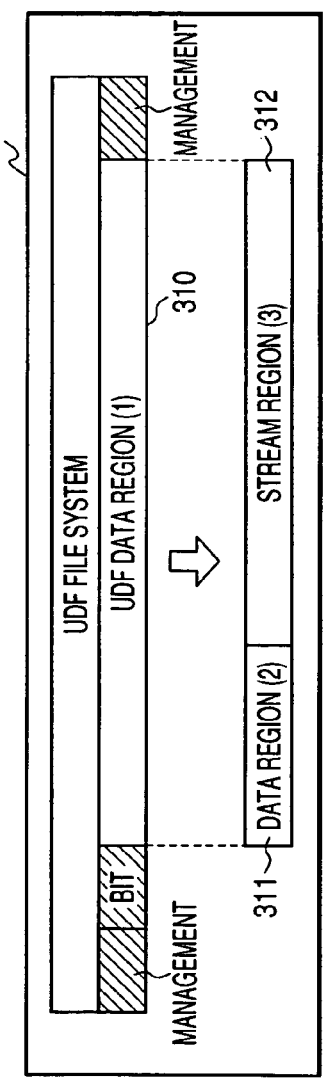

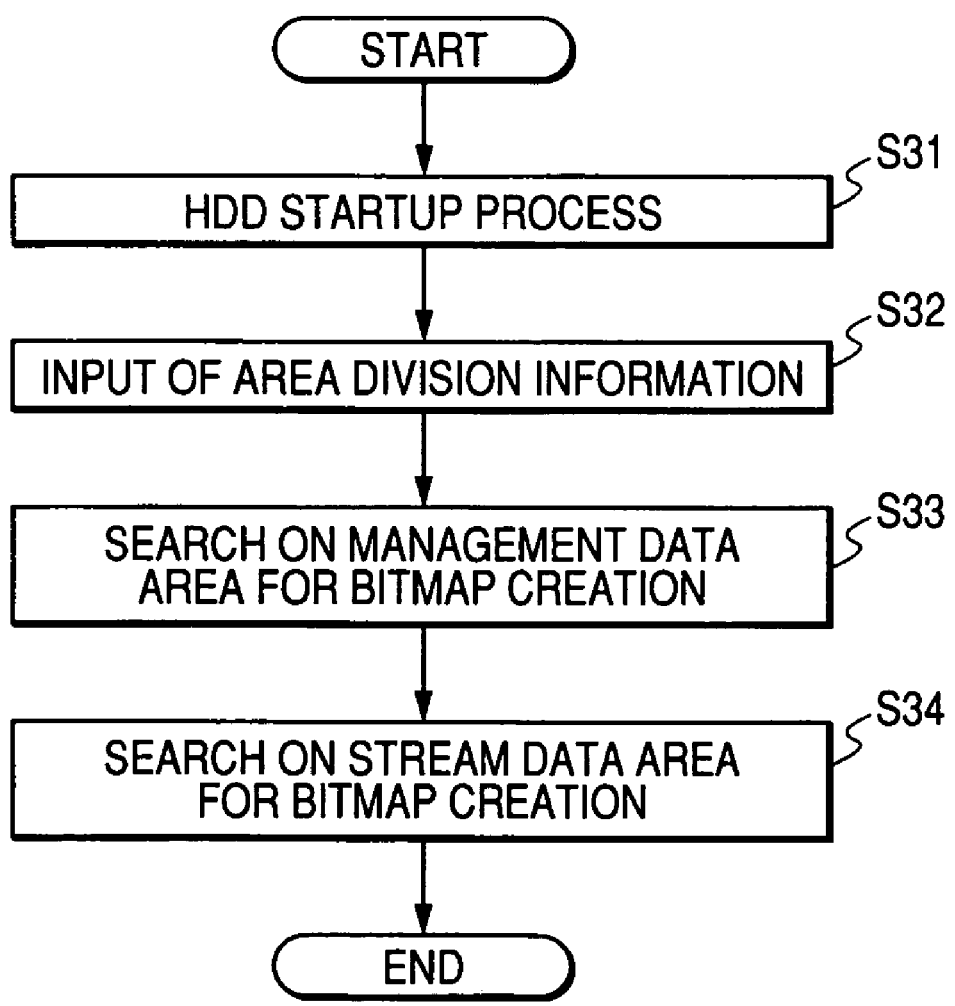

BROADCAST PROGRAM RECORDING METHOD AND BROADCAST RECEIVER, AND INFORMATION RECORDER FOR THE SAME

BACKGROUND OF THE INVENTION

The present invention relates in general to a system and method for handling broadcast audio/video (AV) contents in digital or analog format; and, more specifically, the invention relates to a broadcast receiver which permits recording of broadcast programs with easy to perform operations on an internally-provided information recording medium exemplified by a hard disk drive or other type of storage device, to a method for recording the broadcast programs, and to an information recorder for such use.

In addition to conventional analog television broadcasting, digital television broadcasting has recently received considerable attention in connection with satellite broadcasting with broadcast satellite or communications satellite systems and in terrestrial broadcasting, with the result that systems for receiving various broadcast contents in digital form are becoming widely available for use in ordinary households. Such systems ensure more channels than systems used only for conventional analog broadcasting, so that quite a large number of broadcast programs are available therethrough. For recording and reproduction of such a large number of broadcast programs, various types of AV systems are appearing on the market, e.g., digital VCRs, disk recorders, and other digital devices.

Since the information transmission speed has increased recently, e.g., to 20 Mbps, a stream recording/reproducing system, such as a so-called HDD recorder is well on its way to implementation. The stream recording/reproducing system includes a large-capacity information recording medium, such as a hard disk drive (HDD), so that a large number of channels can be received and stored. Using the HDD allows the recording of video/audio stream data. Such a data stream recording/reproducing system uses a data recorder in the form of a so-called disk recording medium, so that, even if the system stops operation due to a power failure or for other reasons, data reading after failure recovery is ensured by known technology, such as that described in JP-A-2002-32975.

SUMMARY OF THE INVENTION

The issue here is that, in the use of the above-described stream recording/reproducing system, a search typically is run on an HDD to determine the storage state of data, the extent of the free area, and other factors, generally at system startup, i.e., when the system is turned ON. By running a search as such, the operation of the information recording medium for information recording and reproduction needs to be optimally controlled. For such optimal control, with the above-described conventional technology, the Universal Disk Format (UDF) is used as a basis for HDD recording of information concerning broadcast programs received by the receiver, for example. That is, the video/audio stream data is recorded by a unit of HDD writing (1980 Kbytes), and any other data, such as program information, is recorded by a unit of a 2-Kbyte sector. Therefore, to control the storage state of information on an HDD, it is necessary to create two types of bitmap information: one is a UDF bitmap of the sector unit, and the other is an AU bitmap of the HDD writing unit (1980 Kbytes) for the video/audio stream data.

As described above, with the conventional technology, to optimally implement the HDD control, two types of searches are run at the time of system startup on an HDD disk, serving as an information recording medium, to check the storage state of data, the free area, and the like. One search is run by the unit of the 2-Kbyte sector, and the other search is run by the HDD writing unit (1980 Kbytes). As such, with the conventional technology, running two types of HDD searches redundantly at the time of system startup by different units takes rather long, e.g., about a minute, before the system is activated. This delays system startup, resultantly impairing the usability of the equipment for users.

The invention has been developed in consideration of the problems in the above-described conventional technology, and an object thereof is to provide a highly-usable broadcast receiver requiring less time for the search operation, at the time of system startup, on an HDD that records information, including video/audio stream data, thereby enabling quick startup. Also a method is provided for recording broadcast programs received by such a broadcast receiver, and an information recorder is provided for such use.

In order to achieve the above-stated object, the invention is directed to a broadcast program recording method for recording a broadcast program on a recording medium. For recording the broadcast program on the recording medium, the broadcast program is separated into image information and data information. The resulting image information and data information are then each recorded on a different area on the recording medium.

In accordance with the invention, with such a recording method, the image information is preferably recorded by a given information unit on any predetermined area of the recording medium. And, the data information is preferably recorded on any predetermined area of the recording medium, by an information unit, which predetermined area is smaller than the area used for the image information.

Further, in order to achieve the above-stated object, the invention is directed to a broadcast receiver for receiving a broadcast program for recording. The broadcast receiver includes a tuner section for receiving the broadcast program, a received signal conversion section for converting a signal coming from the tuner section into a predetermined format, and a recording medium for recording the signal which has been converted in the received signal conversion section. The recording medium for recording the broadcast program has an area for recording image information of the received broadcast programs which is separate from the area used for recording the data information thereof.

Still further, in order to achieve the above-stated object, the invention is directed to an information recorder that is capable of recording a broadcast program. The information recorder has an area for recording image information of the received broadcast program which is separate from the area used for recording the data information thereof.

In the broadcast receiver and information recorder of the present invention, preferably, the information recording unit used for the area of image information is larger than the unit used for the area of data information. Preferably, the information recorder is configured by a hard disk drive, and the area for the image information and the area for the data information are formed on a disk of the hard disk drive.

As described above, with use of the broadcast program recording method, the broadcast receiver, and the information recorder for such use, according to the present invention, the initialization operation, including the running of a search that has been executed redundantly at the time of system startup on a hard disk drive serving as an information recorder of a broadcast receiver, can be effectively and swiftly implemented. The resulting initialization operation accordingly enables optimum control of the recording/reproduction operation in the information recorder of the broadcast receiver, leading to excellent effects of providing a user-friendly broadcast receiver.

BRIEF DESCRIPTION OF THE DRAWINGS

FIGS. 1A and 1B are diagrams showing an example of a HDD medium area in a broadcast receiver representing an embodiment of the invention, specifically in an HDD serving as an information recorder of the broadcast receiver;

FIG. 2 is a flowchart showing an example of the startup process in the broadcast receiver.

DESCRIPTION OF THE PREFERRED EMBODIMENT

Figure 3:
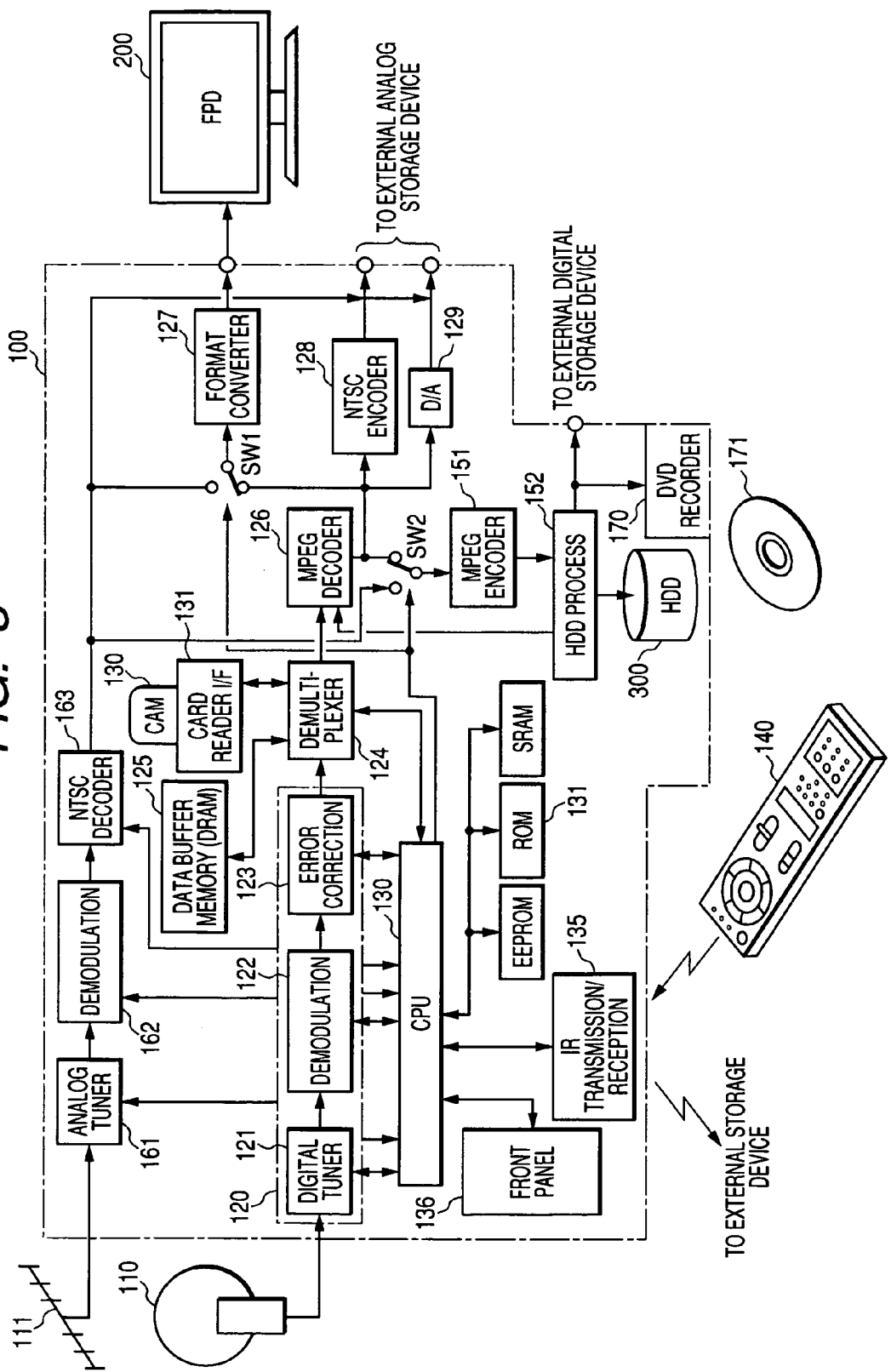
FIG. 3 is a block diagram showing the detailed internal structure of the broadcast receiver.

An embodiment of the present invention will be described in detail with reference to the accompanying drawings.

FIG. 3 is a block diagram showing an example of a broadcast receiver according to the present invention, including an information recorder. In FIG. 3, a reference numeral 100 denotes AV equipment (broadcast receiver) for displaying any received broadcast contents on a flat panel display (FPD) 200. The broadcast contents consist of digital and analog broadcast data, including video/audio-accompanying programs, data broadcast programs, and data broadcast data. The FPD may take the form of a plasma display panel, a liquid crystal panel, and other types of display devices.

In FIG. 3, a reference numeral 110 denotes a dish antenna for receiving a digital broadcast on the air, and an RF signal coming from the antenna 110 is forwarded to a digital tuner 121 for demodulation therein. The digital tuner 121 is part of a digital tuner module (or front end) 120 that is provided in the digital broadcast receiver 100. The output of the digital tuner 121 is forwarded to a QPSK demodulation circuit 122 for QPSK demodulation therein. The QPSK demodulation circuit 122 is also part of the digital tuner module 120. The output of the QPSK demodulation circuit 122 is then forwarded to an error correction circuit 123 which is also provided in the digital tuner module 120. In the error correction circuit 123, any error that may have occurred during transmission is detected and corrected. That is, the digital tuner module 120 tunes signals of given frequency, and it extracts a TS (transport stream).

A demultiplexer 124 receives a signal coming from the error correction circuit 123 in the digital tuner module 120, and it temporarily stores the signal in a data buffer memory (Dynamic Random Access Memory (DRAM)) or Static Random Access Memory (SRAM) 125. The demultiplexer 124 then reads and decodes the thus stored signal as required, and it forwards the resulting video/audio signal to an MPEG decoder 126. Specifically, such a demultiplexing process in the demultiplexer 124 is executed to extract any needed stream from a transport stream (TS), on which various video/audio streams are multiplexed in a multiplexer (MUX) on the transmission end. In the demultiplexing process, so-called filtering is performed to extract any needed stream from various stream packets. More specifically, after a specific channel is selected, the channel has PMT, including a packet ID (PID), each of which is assigned to video and audio streams which make up the services of the channel. On the receiver end, a packet corresponding to the PID is filtered to extract the video and audio streams, so that a broadcast program can be provided.

To the demultiplexer 124, a card reader interface (I/F) 131 is connected to accept a Conditional Access module (CAM) 130 in the form of an IC card, including a CPU, ROM, RAM, and other devices, to read a key stored therein. That is, this IC card 130 stores a key needed for decryption together with a decryption program, and it executes a so-called descrambling process for providing access to incoming scrambled signals, such as pay-per-view programs. In this example, such a decryption key is read from the CAM 130 via the card reader I/F 131 for supply to the demultiplexer 124. The demultiplexer 124 then uses the key to decrypt any encrypted signals.

The video and audio streams thus extracted by the demultiplexer 124 are forwarded to the MPEG decoder 126. In this MPEG decoder 126, the incoming digital signals are stored in an internal DRAM or other storage devices as appropriate, so that a decoding process is executed with respect to video/audio signals that have been compressed by MPEG, specifically by MPEG2.

The broadcast receiver 100 is also provided with an antenna 111 for receiving an analog broadcast. Also provided in the broadcast receiver 100, there are an analog tuner 161, an analog demodulation circuit 162, and an NTSC decoder 163, all of which form part of an analog tuner module. This analog tuner module outputs video/audio signals of an analog broadcast program.

In the broadcast receiver 100, two types of video/audio signals, i.e., the video/audio signal received by the digital tuner module 120 and the video/audio signal converted into a given format by the analog tuner module, go through a switch SW1 for selection therebetween. The selected video/audio signal then goes to a format converter 127 to be converted into a given format for display on the FPD 200, which is exemplified here by a plasma display or a liquid crystal display device. As shown in the drawing, these video/audio signals are also directed to external analog equipment, such as a CRT for display or a VCR for recording. In this example, the video/audio signal in a given format, as a result of conversion in the MPEG decoder 126, is then converted into a so-called NTSC format for output. Such format conversion is applied in an NTSC encoder 128 or a D/A converter 129.

Referring to FIG. 3, the broadcast receiver 100 is provided with a Central Processing Unit (CPU) 130, which executes various processes based on a program stored in the ROM 131. For example, the CPU 130 exercises control over the digital tuner module 120, i.e., the digital tuner 121, the QPSK demodulation circuit 122, and the error correction circuit 123, as well as the analog tuner module, and other elements. The broadcast receiver 100 also includes an IR transmission/reception section 135 for generating or receiving infrared control signals. The CPU 130 outputs any predetermined control signals to other AV equipment via this IR transmission/reception section, or it receives control signals from other AV equipment.

With respect to the CPU 130, various commands can be directly issued through operation of various operation button switches on a front panel 136 located on the front surface of the broadcast receiver 100. To issue commands with respect to the CPU 130, a separate remote controller 140, provided to control the broadcast receiver 100, may be also used by operating its various buttons. With this being the case, from an IR transmission section provided at the tip of the remote controller, a command input signal is directed toward the IR transmission/reception section 132 as infrared rays. Because this command input signal is input to the CPU 130, the CPU 130 also may receive any given commands through operation of the remote controller.

Still referring to FIG. 3, the broadcast receiver 100 includes a hard disk drive (HDD) 300 for the recording of program contents, i.e., video/audio information. The HDD 300 stores data coming from an HDD process circuit 152, which is in charge of data recording and operates to carry out a predetermined recording process. The HDD process circuit 152 receives from the MPEG encoder 151 a digital signal derived by compressing the video/audio signal that has been decoded by the MPEG decoder 126. As indicated in the drawing, the video/audio signal decoded by the MPEG decoder 126 can be directly forwarded to the HDD process circuit 152. For reproduction of any stored information, the compressed signal read from the HDD 300 is sent back to the MPEG decoder 126 after going through the HDD process circuit 152. That is, the decoded video/audio signal produced as a result of the decoding process is forwarded to the format converter 127 for conversion therein into a given format. The result is then output to the FPD 200 for reproduction, or it is output to external equipment, such as a VCR, a DVD recorder, or other device. In FIG. 3, a reference character SW2 denotes a switch for selecting either the video/audio signal coming from the analog tuner module, or the video/audio signal received by the digital tuner module 120, and the selected signal is converted by the MPEG decoder 126.

As clearly shown in the drawing, the broadcast receiver 100 is also provided with a digital information recorder exemplified by a DVD recorder 170. This DVD recorder 170 accepts therein a DVD disk 171, so that the compressed signal read from the HDD 300 can be recorded onto the DVD disk 171 after going through the HDD process circuit 152. The HDD process circuit 152 includes a terminal for directing the signal read from the HDD 300 toward any external digital recorders.

As such, the detailed structure of the broadcast receiver 100 of the present invention will be described. Referring to FIG. 1, the operation of the broadcast receiver 100 will be described, specifically with regard to the manner of recording any received broadcast signals. In the example given below, the operation of recording the video/audio signal onto the HDD 300 via the HDD process circuit 152 will be explained. Herein, the video/audio signal is the one coming from the analog tuner module or the one coming from the digital tuner module 120, and it is compressed by the MPEG decoder 126. Whichever video/audio signal is selected, the signal is compressed by an MPEG encoder 151, serving as a program recording section, before being forwarded to the HDD process circuit 152.

That is, as clearly shown in FIG. 1A, the HDD 300, more specifically, a disk 310 (HDD medium) serving as a recording medium, has a recording area, i.e., a recording surface of the disk, that is divided into two areas consisting of a management data area (simply referred to as a "data area") 311 and a stream data area (simply referred to as a "stream area") 312. These areas are formatted by their respective units for information recording. To be more specific, the management data area 311 is formatted previously by a unit (sector) of 2 KB (bytes), and the stream data area 312 is formatted previously by a unit of 1980 KB (bytes), e.g., 1 AU.

Note here that the term "stream data" means digital video/audio signals (data) derived by the above-described broadcast receiver 100. On the other hand, the term "management data" means other than except the stream data, e.g., recorded program titles, thumbnails, information telling whether the recorded program is viewed or not, or other data.

As shown in FIG. 1B, according to the present invention, the HDD 300 includes a UDF file system 310, and, therein, a "UDF data area" is divided into the "data area" 311 and the "stream area" 312. In the "UDF data area", the "management data" and the "stream data" are conventionally recorded and managed with no distinction therebetween (with redundancy). That is, compared with the "management data", the "stream data" is quite large in capacity. Accordingly, the inventors of the present invention have found, based on past experience, that separately managing the "data area" 311 and the "stream area" 312 for data storage on the disk 310 enables more efficient disk management.

In FIG. 1B, the left side is the innermost recording area of the disk medium, i.e., the HDD medium 310, and the right side is the outer recording area thereof. In the drawing, the term "management" denotes an area in which the UDF file system, for storing management information used for HDD management is configured, and the term "Bit" denotes an area for storing bitmap information. The "management" area stores, for example, "area division information" about the "data area" 311 and the "stream area" 312. The "area division information" is previously created when the HDD is formatted to create the UDF file system.

Referring to FIG. 2, a description will now be given of the startup process (initialization) of the HDD 300, i.e., the operation carried out at the time of system startup of the above-described broadcast receiver 100, i.e., when the system is turned ON.

As clearly shown in FIG. 2, once the process is started, the process is verified as being the startup process (step S31), and area division information about the HDD 300 is received (step S32). Thereafter, based on the thus received area division information, a search is run on the "data area" 311 of the UDF file system, and a bitmap is then created. The resulting bitmap is stored in a flash memory, for example (step S33). This search is run with a unit (sector) of 2 KB (bytes) corresponding to the "data area" 311. Then, similarly, another search is run on the "stream area" 312, and a bitmap is created for storage in the flash memory, for example (step S34). This is the end of the process. For the search in step S34, a unit of 1980 KB (bytes) is used, e.g., 1 AU, corresponding to the "stream area" 312. The thus created bitmaps are then used as a basis to calculate the available capacity in the HDD 300, and the recording/reproduction operation of the broadcast receiver 100 is optimally controlled. This is similar to the conventional technology, and thus is not described here again.

As described in detail above, in the broadcast receiver 100, especially the HDD 300 serving as an information recorder thereof, to see the free area or others of the HDD medium 310 at the time of system startup (when the system is turned ON), a search is run on the HDD medium 310 separately for the larger-capacity "stream area" 312 storing the "stream data" and the "data area" 311 storing the "management data" using each corresponding unit. With search execution as such, the search operation is not unnecessarily redundantly repeated, but can be done with high efficiency and swiftness, and the recording/reproduction operation can be optimally controlled in the information recorder of the broadcast receiver.

In the embodiment described above, on the HDD medium 310 of the HDD 300, the "data area" 311 for storing the "management data" is placed inside the "stream area" 312 for storing the "stream data", and in the startup process (initialization), the "data area" 311 is searched before the "stream area" 312. However, the invention is not restricted thereto, and the "data area" 311 may be placed outside the "stream area" 312, and the "stream area" 312 may be searched before the "data area" 311.

What is claimed is:

1. A broadcast program recording method for recording a broadcast program on a recording disk medium, the method comprising:

setting up, in one of an inner circumference area or an outer circumference area of the recording disk medium, a first area which is managed via a first information recording unit;

setting up, in an opposite one of the inner circumference area or the outer circumference area of the recording disk medium than the inner circumference area or the outer circumference area which is used for the first area, a second area which is managed via a second information recording unit smaller than the first information recording unit;

separating the broadcast program into image information and data information;

recording the image information on the first area; and recording the data information on the second area;

storing bitmap information of the first area and bitmap information of the second area in an area different from the first area and the second area;

creating area division information about the first area and the second area; and storing the area division information in a management area different from the first area and the second area.

2. A broadcast receiver adapted to record a broadcast program on a recording disk medium, comprising:

a tuner section for receiving a broadcast program;

a received signal conversion section for converting a signal coming from the tuner section into a given format;

a recording disk medium for recording the signal converted by the received signal conversion section, the recording disk medium having, in one of an inner circumference area or an outer circumference area of the recording disk medium, a first area which is managed via a first information recording unit, and having, in an opposite one of the inner circumference area or the outer circumference area of the recording disk medium than the inner circumference area or the outer circumference area which is used for the first area, a second area which is managed via a second information recording unit smaller than the first information recording unit;

a separator section for separating the broadcast program into image information and data information;

a recorder section for recording the image information on the first area, and for recording the data information on the second area;

a bitmap section for storing bitmap information of the first area and bitmap information of the second area in an area different from the first area and the second area; and an area division section for creating area division information about the first area and the second area, and for storing the area division information in a management area different from the first area and the second area.

3. The broadcast receiver according to claim 2, wherein the recording disk medium is configured by a hard disk drive.

4. An information recorder adapted to record a broadcast program on a recording disk medium, comprising:

a tuner section for receiving a broadcast program;

a received signal conversion section for converting a signal coming from the tuner section into a given format;

a recording disk medium for recording the signal converted by the received signal conversion section, the recording disk medium having, in one of an inner circumference area or an outer circumference area of the recording disk medium, a first area which is managed via a first information recording unit, and having, in an opposite one of the inner circumference area or the outer circumference area of the recording disk medium than the inner circumference area or the outer circumference area which is used for the first area, a second area which is managed via a second information recording unit smaller than the first information recording unit;

a separator section for separating the broadcast program into image information and data information;

a recorder section for recording the image information on the first area, and for recording the data information on the second area;

a bitmap section for storing bitmap information of the first area and bitmap information of the second area in an area different from the first area and the second area; and an area division section for creating area division information about the first area and the second area, and for storing the area division information in a management area different from the first area and the second area.

5. The information recorder according to claim 4, wherein the recording disk medium is configured by a hard disk drive.

* * * * *